United States Patent
Grohmann et al.

(10) Patent No.: US 8,162,607 B2
(45) Date of Patent: Apr. 24, 2012

(54) ROTOR BLADE FOR A ROTARY WING AIRCRAFT

(75) Inventors: Boris Grohmann, Taufkirchen (DE); Christoph Maucher, Munich (DE); Andree Altmikus, Hoehenkirchen-Siegertsbrunn (DE); Stephan Mangelsdorf, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 824 days.

(21) Appl. No.: 12/158,928

(22) PCT Filed: Dec. 8, 2006

(86) PCT No.: PCT/EP2006/011812
§ 371 (c)(1), (2), (4) Date: Nov. 21, 2008

(87) PCT Pub. No.: WO2007/079855
PCT Pub. Date: Jul. 19, 2007

(65) Prior Publication Data
US 2009/0269198 A1    Oct. 29, 2009

(30) Foreign Application Priority Data
Dec. 21, 2005  (DE) .......................... 10 2005 061 751

(51) Int. Cl.
*B64C 27/615*  (2006.01)
(52) U.S. Cl. ........................................................ 416/23
(58) Field of Classification Search ............... 416/23–24
See application file for complete search history.

(56) References Cited

U.S. PATENT DOCUMENTS

| | | |
|---|---|---|
| 3,042,371 A | 7/1962 | Fanti |
| 3,930,626 A | 1/1976 | Croswell, Jr. |
| 5,114,104 A | 5/1992 | Cincotta et al. |
| 5,150,864 A | 9/1992 | Roglin et al. |
| 5,224,826 A | 7/1993 | Hall et al. |
| 5,366,176 A | 11/1994 | Loewy et al. |
| 5,529,458 A | 6/1996 | Humpherson |
| 5,662,294 A | 9/1997 | Maclean et al. |

(Continued)

FOREIGN PATENT DOCUMENTS
DE    10061636    6/2002
(Continued)

OTHER PUBLICATIONS

Steven R Hall et al: "Development of a Piezoelectric Servoflap for Helicopter Rotor Control" Smart Materials and Structures, IOP Publishing Ltd., Bristol, GB vol. 5, No. 1, Feb. 1, 1996, pp. 26-34, XP020071789.

(Continued)

*Primary Examiner* — Matthew W Such
(74) *Attorney, Agent, or Firm* — Brooks Kushman P.C.

(57) ABSTRACT

A rotor blade including a rotor blade profile including a profile tip region, a profile trailing edge region including a trailing edge and a profile body having a profile core. A covering skin including an upper skin and a lower skin encase the profile core. A reversibly bendable flexural actuator including a first actuator end disposed at the trailing edge region of the rotor blade profile and a second actuator end projecting past the profile body toward the trailing edge. The second actuator end forms part of the trailing edge region and forms a movable rotor blade flap, the movable rotor blade flap being deformable into an arc-shaped rotor blade flap deflection upon a bending of the flexural actuator.

31 Claims, 6 Drawing Sheets

U.S. PATENT DOCUMENTS

| | | | |
|---|---|---|---|
| 5,752,672 A * | 5/1998 | McKillip, Jr. | 244/99.8 |
| 6,135,713 A * | 10/2000 | Domzalski et al. | 416/23 |
| 6,168,379 B1 * | 1/2001 | Bauer | 416/23 |
| 6,196,796 B1 * | 3/2001 | Lozyniak et al. | 416/24 |
| 6,200,096 B1 * | 3/2001 | Kohlhepp | 416/24 |
| 6,220,550 B1 * | 4/2001 | McKillip, Jr. | 244/215 |
| 6,474,945 B1 * | 11/2002 | Nakasato et al. | 416/23 |
| 6,508,439 B1 * | 1/2003 | Fink et al. | 244/215 |
| 6,644,919 B2 * | 11/2003 | Bauer et al. | 416/23 |
| 2001/0006207 A1 | 7/2001 | Caton et al. | |
| 2002/0021964 A1 * | 2/2002 | Janker | 416/9 |
| 2002/0043590 A1 | 4/2002 | McCallum et al. | |
| 2002/0141867 A1 * | 10/2002 | Preissler | 416/23 |
| 2004/0183408 A1 | 9/2004 | Levy et al. | |

FOREIGN PATENT DOCUMENTS

| | | |
|---|---|---|
| DE | 202004006333 | 6/2004 |
| DE | 202004006333 U1 * | 7/2004 |
| DE | 103 04 530 | 8/2004 |
| DE | 10334267 | 2/2005 |
| DE | 10334267 A1 * | 2/2005 |
| EP | 0262637 | 4/1988 |
| EP | 0814019 | 12/1997 |
| JP | 08216997 | 8/1996 |
| WO | 01/31715 | 5/2001 |
| WO | 2004/069651 | 8/2004 |
| WO | WO 2004088130 A1 * | 10/2004 |
| WO | 2004/108525 | 12/2004 |

OTHER PUBLICATIONS

Giurgiutiu V et al: "Incrementally Adjustable Rotor-Blade Tracking Tab using SMA Composites" AIAA/ASME/ASCE/AHS/ASC Structures, Structural Dynamics and Materials Conference and Exhibit and AIAA/ASME/AHS Adaptive Structures Forum, No. 2, Mar. 7, 1997 pp. 1456-1466, XP002075057. pp. 1458, (right- hand column) 1461 (right-hand column), 1464 (right-hand column).

* cited by examiner

ROTOR BLADE FOR A ROTARY WING AIRCRAFT

CROSS REFERENCE TO PRIOR APPLICATIONS

This application is a U.S. National Phase application under 35 U.S.C. §371 of International Application No. PCT/EP2006/011812, filed on Dec. 8, 2006 and claims benefit to German Patent Application No. DE 10 2005 061 751.4, filed on Dec. 21, 2005. The International Application was published in German on Jul. 19, 2007 as WO 2007/079855 under PCT Article 21 (2).

The present invention relates to a rotor blade having a movable rotor blade flap, in particular for a rotary wing aircraft such as, for example, a helicopter; and to a rotary wing aircraft having such a rotor blade.

BACKGROUND

Air eddies occur on rotor blades of a rotary wing aircraft during operation. These eddies generate noise and vibration that are detectable, for example, in the cabin of the rotary wing aircraft and thus negatively affect the passengers' comfort. Such vibrations are additionally disadvantageous in terms of service life and maintenance, since they can result in material fatigue of the components and ongoing relative motion of the components, with wear associated therewith.

The causes of this noise and vibration are asymmetrical flow conditions and complex aeromechanical and aeroelastic phenomena, the collision of a rotor blade with blade eddies of a respectively leading rotor blade, and the forces that result therefrom and act on the rotor blade. In order to account to the greatest extent possible for different flight parameters and varying angles of attack, rotor blades in which the shape of the rotor blade in the trailing edge area can be changed are used. By specific adaptation of the rotor blade shape in the trailing edge area, noise and vibration can be reduced, and at the same time flight performance and flight trajectory can be improved.

Rotor blade flaps on the trailing edge of the rotor blade are known for this purpose in the existing art; these flaps are, for example, mounted movably on a rotor blade profile body with the aid of a pivoting bearing. DE 101 16 479 A1 describes one such rotor blade, the rotor blade flap being drivable via a piezoactuator that is arranged, spaced away from the flap in a profile depth direction, in a front profile region of the rotor blade profile body. The piezoactuator generates positioning forces, and transfers them to the rotor blade flap via ribbon- or bar-shaped tension elements.

With this type of rotor blade, the effectiveness of the rotor blade flap weakens after only a relatively short service life. DE 103 34 267 A1 therefore describes a rotor blade having an elastically movable rotor blade flap, such that piezoelectric actuators are mounted into the rigid covering skins of the blade profile, or immediately below the rigid covering skins, or on the rigid covering skins, so that one of the two piezoelectric actuators on the upper-side covering skin or lower-side covering skin of the blade profile can be selectably actuated, and thus causes a displacement of the respective covering skin relative to the other covering skin, which shortens or lengthens the upper covering skin relative to the lower covering skin. As a result of the relative shortening of one covering skin with respect to the other, the rigid rotor blade flap attached to the covering skins is deflected, and is moved upward or downward.

JP 8-216-997 describes a rotor blade for a helicopter in which the covering skin in the area surrounding the trailing edge of the rotor blade can expand and contract, at least in the direction of the profile chord, with the aid of a piezoelectric element.

A similar arrangement is also described in DE 103 04 530 A1, the piezoelectric actuators either being integrated into the profile, for which no flap is provided, or alternatively being provided exclusively in the flap. In the case of the piezoactuators provided in the flap, the profile flap is deformed by means of the piezoelectric actuators.

SUMMARY OF THE INVENTION

An aspect of the present invention is to provide a rotor blade that has a rotor blade flap, is mechanically and kinematically simple, possesses favorable aerodynamic properties, and enables a continuously transitioning deformation in the profile chord direction and profile spanwise direction.

An aspect of the present invention is to provide activation or actuation of the rotor blade flap, i.e. generation of a flap deflection, by means of a reversibly bendable flexural actuator, preferably a piezoelectric actuator that is a constituent of the flexural actuator. By way of this flexural actuator, which itself is a constituent of the rotor blade flap, the rotor blade flap is reversibly deformed in order to generate the flap deflection. The flexural actuator is preferably planar; it can be made up of one or more plate- and/or ribbon-shaped elements. "Planar" means that the flexural actuator is thin in one spatial direction, preferably a direction substantially perpendicular to the surface of the profile, with respect to the other spatial directions. In planar flexural actuators, the orientation is preferably such that the principal surfaces extend substantially along the profile surfaces of the rotor blade profile. The principal surfaces of the flexural surfaces can be located at a varying or constant distance from the outer side of the profile. An advantage of this aspect is that the flexural actuator can experience a defined deformation or bending.

DETAILED DESCRIPTION

An aspect of the present invention is that at least one mounting region of the flexural actuator is embedded into the profile body of the rotor blade profile, or that the flexural actuator is mounted at a first end in the profile body, is on the one hand that no additional mechanical elements, for example hinges, are necessary for mounting a flap. On the other hand, a deformation of the flap region, along with triggering or actuation of the flap motion, can be accomplished by means of the same flexural actuator, so that the structure is mechanically relatively simple. Because the flexural actuator is moreover anchored in the profile structure, stable mounting is guaranteed. Because the entire rotor blade flap, which may include a filler layer located between a covering skin and the flexural actuator, is deformed, no abrupt transitions occur, but instead there is in all flap deflection states a uniform, continuous contour that can vary both in the profile chord direction and in the spanwise direction, or even in only one of the two directions, when different regions of the flexural actuator are activated.

In an embodiment, a normal profile covering skin, made for example of fiber composite that is extremely stiff and imparts stability to the profile, is not present in the region of the flexural actuator. Instead, either a flexurally elastic or rubber-elastic protective skin may be present, a rubber-elastic or flexurally elastic first filler material is applied onto the flexural actuator, or the flexural actuator is exposed, in order to ensure that the rotor blade flap can easily bend or deform. Combinations of a protective skin and filler material are likewise possible. As an alternative thereto, the usual stiffening covering skin, which may be manufactured from fiber composite, is present at least not continuously or at its normal thickness on the bendable rotor blade flap region, in order to ensure that said region can bend. At least a local thin spot, which forms a so-called virtual joint, may be present in the covering skin, or the covering skin in the trailing edge region of the profile may be embodied as a whole to be much thinner than usual, so that it is easily deformable upon the application of forces by the flexural actuator. A deformable point can also be constituted, for example, by a local flexurally soft inset in the covering skin, or by an integrated flexurally soft material.

The flap deflection is thus arc-shaped, i.e. continuously curved with no inflections or discontinuities. This largely prevents the generation of unfavorable turbulence and elevated resistance associated therewith, as is the case with an interrupted surface contour or with corners or inflections in the contour; this contributes to uniform, non-vibrating operation and to a uniform flow pattern. The rotor blade thus possesses improved aerodynamic properties in the context of a flap deflection.

According to a preferred embodiment, the flexural actuator contains a piezoelectric actuator, the latter being, for example, a d33 piezoelement, a d31 piezoelement, or even a different element that is activatable and changes shape as a result of the delivery of electric current, for example piezopolymers or piezoceramics in forms other than a stack.

Also possible, for example, is a plate-shaped flexural actuator made of a shape-memory alloy. It is additionally preferred that the flexural actuator contain fiber composite material or composite material, for example in a layer-like structure of plate-shaped support material and a piezoelectric actuator. Particularly preferably, the flexural actuator is constructed in three layers, with a support layer made of fiber composite material and piezoelements applied thereonto on both sides, resulting in a sandwich-like structure. Possibilities as the support layer are, in particular, glass fiber-reinforced plastic having anisotropic or isotropic properties as necessary, e.g. having a matrix made of a duromeric resin (e.g. epoxy resin) or a thermoplastic resin. The support layer may also be reversibly bendable, so that it follows the defined deflection resulting from the activated flexural actuator. The support layer can be embodied, for example, as a spring element or with a preload, so that it exerts a return force on the flexural actuator in a neutral position when the flexural actuator is not activated, or its preload force may be overcome upon activation of the flexural actuator.

By arranging multiple piezoelectric actuators, for example in ribbon form, on the support material in the spanwise direction or in the profile chord direction or in the spanwise direction and profile chord direction in combination, it is possible to achieve a profile contour free of inflections and gaps, including the trailing edge region that adjoins the rotor blade flap, and including the rotor blade flap itself, in both the deformed and undeformed state, and to expand the possibilities for activation and shape change as a rotor blade flap by the fact that the latter can be bent reversibly in a manner defined as a function of activation of the flexural actuator.

The, for example, piezoelectric actuator and/or the support material can have activation and shape change properties that vary over the surface or are adapted to the loads or the force to be generated, thus providing further flexibility with regard to activation capabilities and the deformation of the rotor blade flap. In particular, the construction of the flexural actuator from the, for example, piezoelectric actuator or actuators and the support material can be such that, for example, a maximum excursion of the flap, or the aerodynamic effectiveness of the flap or of the rotor blade profile, is optimized. Such optimization can also be intensified by the fact that the layers of the flexural actuator, or the elements that form it (such as the piezoelectric actuator and the support material) are specifically oriented with respect to the material properties, if they are anisotropic materials and thus direction-dependent.

A flexible filler material, whose outer side constitutes the outer contour of the rotor blade profile in this region thereof, is preferably applied onto the flexural actuator. The flexible filler material can cover the flexural actuator completely, or also only partially. In accordance with a preferred embodiment, the flexible or rubber-elastic filler material can constitute a flexible protective skin. Alternatively, an additional flexible, flexurally elastic protective layer can surround the flexible filler material as an external termination, so that the flexible filler material is located between the flexural actuator and the protective skin. In this case the protective skin can be, for example, a flexible film, a material subsequently vulcanized on, a protective coating, or the like. Both the filler material and the protective skin can be provided on one side or both sides of the flexural actuator or of a support layer. The use of filler material offers a particularly smooth transition between the rotor blade profile and the rotor blade flap in terms of the contour, since the filler material can be arbitrarily contoured. In particular, the filler material can extend onto the profile body or its covering layer, and/or below them, i.e. between the core and covering layer, and in cross section can enclose the profile body in its end region in, for example, a forked or pincer shape. The profile body can, for example, taper to a point into the filler material over an arbitrarily selectable length.

As an alternative thereto, the flexural actuator constitutes the flap without further filler material; in this case the anchoring region of the flexural actuator is located on or in the trailing edge region of the profile. No further flexible layers are then provided in the region of the rotor blade flap, except optionally a flexurally elastic protective skin immediately contiguous with the flexural actuator, or a protective skin on the support material of the flexural actuator.

It is preferred to use for the flexible filler material a foam material, an elastomeric material, or silicone, as a homogeneous, flexible material that follows the change in shape of the flexural actuator and thus results in a flap deflection and a change in flap shape that correspond to the deflection and shape change of the flexural actuator. Alternatively, the filler material can be constituted by a framework-like material, i.e. an inhomogeneous material or a structure. Stiffening elements of this kind, for example rib-shaped, preferably extend in the profile thickness direction when viewed in a cross section of the rotor blade profile.

In order to constitute an interface between the profile body and rotor blade flap, a mounting device for the rotor blade flap is preferably provided in such a way that the rotor blade flap can be detached, for example for replacement or maintenance or inspection. An interface of this kind contains both a mechanical interface, which ensures that the mechanical properties of the original rotor blade are retained when the rotor blade and the rotor blade flap are separated and then put back together again, and an electrical interface having electrical connections which ensures, on the basis of mutually fitting elements on two components, that, for example, electric contacting, which preferably is effected through the interior of the profile core, can be re-established without difficulty. Because the interface is not exposed to the environment when the flap is installed, both it and the flexural actuator are protected from environmental influences, such as dirt, during operation. Instead of an interface having a capability for detachment of the flexural actuator from the profile body, the flexural actuator can also be mounted non-detachably on the profile.

The mounting device can comprise a connector profile structure into which the flexural actuator is insertable, for example by means of an insertion opening. Alternatively a, for example, forked connector region of the flexural actuator can be capable of being slipped onto a mounting projection. The connector profile structure is connectable to the profile core or the profile body, for example, by being adhesively bonded in, bonded on, bolted on, riveted on, or directly laminated on. The mounting device, or in particular a mounting projection or an insertion opening of a connector profile structure, preferably extends toward the trailing edge of the profile.

For example, it can be constituted by a substantially U-shaped profile that opens toward the trailing edge of the profile and is embedded into the profile body. The U-profile is preferably manufactured from a relatively strong material such as, for example, a fiber composite. The receiving structure for the flexural actuator is constituted, for example, by two further substantially U-shaped profile elements that are curved toward the trailing edge of the profile and open toward the profile tip, the connector profile structure for the flexural actuator being constituted, between the two further profile elements, in the form of a channel-like slot. The profile elements are each connectable to the rigid covering skins of the profile. The flexural actuator can be introduced, and mounted positively and/or nonpositively, between the two U-shaped profiles of the receiving structure that bulge toward the trailing edge. This structure ensures that shear forces are transferred between the upper and the lower casing, which guarantees that the torsional stiffness of the rotor blade is maintained. At the same time, this interface provides a flexural interface that can transfer mechanical loads between the flexural actuator and the rotor blade profile. Electrical or other connectors for actuation and, if applicable, sensor functions, of the flexural actuator can be embodied, for example, inside the slot-like channel.

Alternatively, the mounting device is constituted by a U-shaped profile which is curved toward the trailing edge of the profile and whose open side faces toward the profile tip. A connector profile structure for the flexural actuator, which structure is constituted as an open channel extending toward the trailing edge of the profile, is formed in a second profile that is likewise curved toward the trailing edge of the profile. The second, substantially U-shaped profile fits over the first profile on the outer side. This guide or connector profile structure for the flexural actuator can be configured, for example, as a slot-shaped opening into which the flexural actuator can be slid or introduced, and anchored by positive and/or nonpositive engagement. Alternatively, it can be configured as a projection that fits around the flexural actuator on the outer side and through which the electrical contacts can be guided. In any case, a shear interface that transfers shear forces is provided between the upper and the lower covering skin.

The profile elements forming the connector profile structure can be connected to the upper or lower covering skin directly or indirectly, e.g. via segments of further profile elements or connecting elements. They can furthermore each be configured integrally or in multiple parts.

The various elements of the mounting device, if the latter is in multiple parts (e.g. the first U-shaped profile and/or an anchor in the profile core), can be connected to one another by positive and/or nonpositive engagement. To increase the stiffness of the interface, it is preferred that the profiles additionally be at least partly filled up with a second filler material that increases stiffness. The flexural actuator or the connector profile structure is preferably mounted in this region having increased stiffness. The stiffness of this second filler material should be greater than that of the profile core. To eliminate excessive discontinuities in the stiffness of the materials, the second filler material can be configured with indentations or depressions in order to achieve a gradual transition from the second filler material to the profile core and/or to the covering skin.

A further alternative connecting structure provides for a U-shaped profile that is curved toward the trailing edge of the profile, and an extension extending toward the trailing edge of the profile. The flexural actuator is mountable externally onto this extension.

The U-shaped profile can be configured symmetrically or asymmetrically in all configurations. The receptacles for mounting the flexural actuator can be provided on the first U-shaped channel asymmetrically or symmetrically, as necessary.

Figure 1:
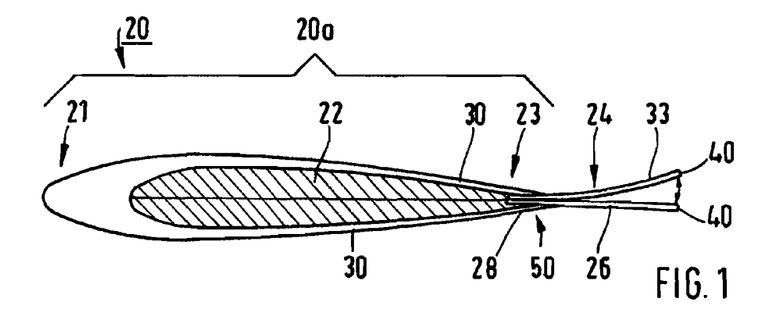
FIG. 1 is a cross-sectional view through a rotor blade according to an embodiment of the invention.
Figure 2:
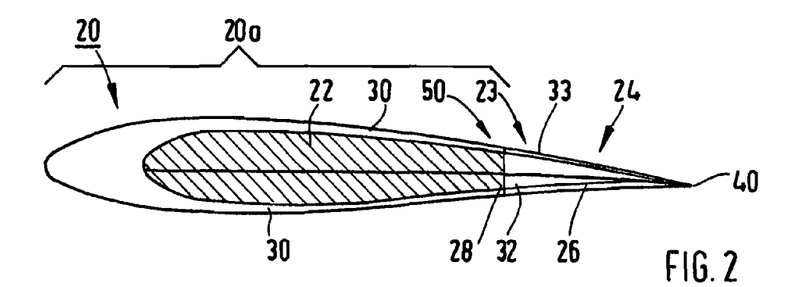
FIG. 2 is a cross-sectional view through a rotor blade according to another embodiment of the invention.

FIGS. 1 and 2 show two embodiments of a rotor blade 20 according to the present invention. Rotor blade 20 possesses a profile body 20a having a profile core 22, and further comprises a profile tip region 21 and a trailing edge region 23 having a trailing edge 40. Profile core 22 extends from profile tip region 21 to trailing edge region 23. Rotor blade 20 furthermore possesses a rotor blade flap 24 that adjoins profile trailing edge region 23. The cross sections through rotor blade 20 shown in FIGS. 1 and 2 are cross sections perpendicular to the spanwise direction and in the profile depth direction of rotor blade 20.

In the embodiment shown in FIG. 1, rotor blade flap 24 is constituted by a flat or ribbon-shaped flexural actuator 26 (multimorph flexor) that comprises, at its end facing toward profile tip region 21, a mounting device 28 with which it is embedded and mounted, at a mounting region 50, into profile core 22 or profile body 20a. In FIG. 1, flexural actuator 26 that constitutes rotor blade flap 24 is shown in two different deflection positions. Flexural actuator 26 is covered on both sides by a flexible or elastic protective skin 33. Protective skin 33 can also be provided on only one side. Profile core 22 of rotor blade 20 is covered by a largely rigid upper and lower covering skin 30 that contributes to stability. Flexural actuator 26 thus forms, in trailing edge region 23 of the rotor blade profile, an extension of profile core 22 or of profile body 20a. Profile body 20a and rotor blade flap 24 with its flexural actuator 26 together constitute the rotor blade profile.

Unlike the case with rotor blade profile 20 shown in FIG. 1, with rotor blade profile 20 shown in FIG. 2, not only is mounting device 28 of flexural actuator 26 embedded in profile core 22 or in mounting region 50 of profile body 20a, but a flexurally elastic first filler material 32 is also introduced between protective skins 33 in the region of rotor blade flap 24 and flexural actuator 26. As a result, not only is mounting device 28 attached to profile body 20a in a manner protected from environmental influences, but the entire flexural actuator 26 is protected. In addition, the transition between profile body 20a or its end region, and rotor blade flap 24, can be shaped uniformly and without disruptive edges or steps. Because of the elasticity of first filler material 32 and of protective skin 33, at least in trailing edge region 23 of rotor blade 20, a deflection of trailing edge region 23 of rotor blade 20 in flap-like fashion can be ensured, although rotor blade flap 24 additionally is deformed in an arc-shaped reversible fashion.

This configuration is especially preferred for comparatively thin rotor blade profiles, since because the layer of elastic first filler material 32 is relatively thin, there is no limitation on the transfer of the change in motion and shape change of flexural actuator 26 in order to change the profile outer contour. A change in the configuration of trailing edge region 23 of rotor blade 20 in a desired, flap-like fashion, i.e. at least similar to the case with the use of rigid rotor blade flaps, is thus still ensured. Discontinuities (inflections, etc.) between profile body 20a and rotor blade flap 24 in the context of flap deflection are also avoided.

Figure 3:
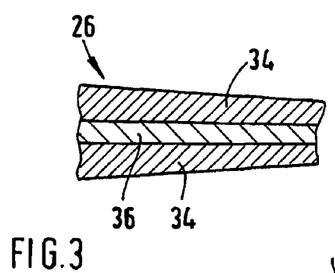
FIG. 3 shows, in an enlarged view, a portion of a flexural actuator of the rotor blade according to the present invention, in a cross-sectional view.
Figure 4:
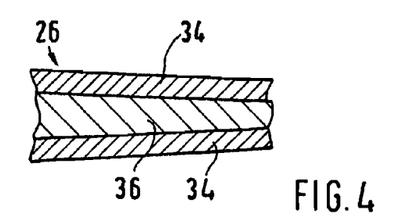
FIG. 4 shows an alternative embodiment to FIG. 3.
Figure 5:
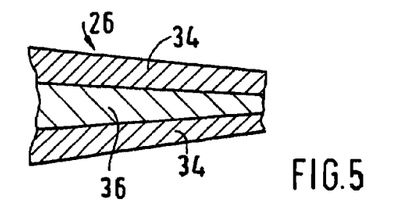
FIG. 5 shows a further alternative embodiment to FIG. 3.

FIGS. 3 to 5 show the configuration of a flexural actuator 26 in greater detail, in a variety of embodiments. Suitable in principle as elements that constitute flexural actuators 26 are elements that change their shape in defined fashion upon activation or actuation, for example by application of an electrical voltage or also in another fashion, e.g. magnetostrictively. For example, flexural actuator 26 can contain piezoceramics, for example d33 or d31 piezostacks, or piezopolymers, which upon impingement of a voltage expand or contract in at least one spatial direction in defined fashion, i.e. in a predictable manner depending on the magnitude of the activation parameter. FIGS. 3 to 5 show various arrangements of flexural actuator 26, which contains not only piezoceramics but also a support layer 36 made of fiber composite or composite material (e.g. made of glass fiber-reinforced plastic). Flexural actuators 26 are substantially ribbon- or plate-shaped and are thin, in particular in one spatial direction (the cross-sectional direction depicted in FIGS. 3 to 5), as compared with the local profile thickness in the profile trailing edge region.

In the view depicted in FIG. 3, the layer thickness (stack thickness) of piezoelectric element 34, which is applied onto both sides of a support layer 36 made of fiber composite (e.g. glass fiber-reinforced plastic), is additionally adjusted for optimization and adaptation to the flexural distribution or aerodynamic effectiveness of rotor blade flap 24. In particular, support layer 36 is configured with a constant thickness, while piezoelectric elements 34 exhibit linearly decreasing thicknesses in the profile depth direction. The piezoelectric element can also be, for example, a configurationally adapted piezostack that is processed by material-removing conformation.

FIG. 4 shows the opposite case, in which piezoelements 34 have a constant thickness while support layer 36 made of glass fiber-reinforced plastic has a varying thickness.

Lastly, FIG. 5 shows a combination in which both piezoelectric elements 34 and support layer 36 of glass fiber-reinforced plastic are variable in terms of their thickness.

With the arrangement in the context of a rotor blade flap 24 of a rotor blade, it is possible to arrange multiple piezoelements, having piezoelectric properties identical to or different from one another, next to or behind one another both in the spanwise direction and in the profile chord direction, e.g. distributed in checkerboard fashion or regularly or irregularly. Multiple individual piezostacks can be grouped into segments that in turn are applied onto segments of the material of a support layer. The shape, size, and arrangement both of the segments of the support layer and of the piezoelements can be selected as required. Contacting to such segments of piezoelements can be accomplished by, for example, applying an electrical voltage through a power bus in the spanwise direction, and contacting the piezos in the profile chord direction. It is possible in this context to provide multiple mutually insulated electrical leads in the spanwise direction, which results in redundancy of the actuators, the wiring, and the amplifiers. At the same time, the segments can be actuated independently of one another in the spanwise direction, so that contours having smooth transitions in the spanwise direction and the profile chord direction upon flap deflection can be achieved. In particular, for example, a region where the flap is not deflected and a region where the flap is deflected can be provided along the spanwise direction during operation, a uniform, continuous transition regions being provided between said regions.

FIGS. 6 to 14 show various possibilities for implementing interfaces, i.e. connections that can be repeatedly detached and re-established without substantial realignment, between profile core 22 or profile body 20a and rotor blade flap 24. The shear forces can be transferred between the upper and the lower covering skin 30 via the interfaces, i.e. that twisting of the rotor blade is possible. This requires that a stiff flexural and shear interface be provided so that the forces received in profile body 20, which is embodied e.g. as a torsion box, can also be transferred into mounting region 50 of rotor blade flap 24.

It is particularly preferred if the interface is configured so that rotor blade flap 24 is completely separable from profile body 20a. For this purpose, the mechanical interface can provide a positively engaged or nonpositively engaged transition between the separable components, or a combination of the two, for example by way of screws, bolts, rivets, or the use of tongue and groove profiles.

Figure 6:
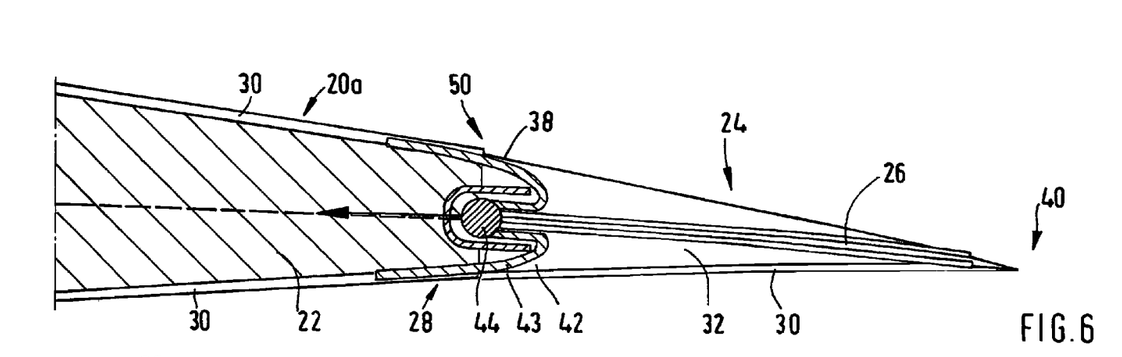
FIG. 6 is an enlarged view of a trailing edge region of a rotor blade profile of the rotor blade according to the present invention that possesses an electrical and mechanical interface.

Examples for increasing stiffness, and for the location of, for example, an electrical interface, are likewise shown in the aforesaid Figures. For example, FIG. 6 shows an arrangement in which a flexurally elastic filler material 32 is introduced in the region of rotor blade flap 24 between flexural actuator 26 and the flexible protective skin 33. A first U-shaped profile 38 that is open toward profile trailing edge 40 is embedded at least locally into profile core 22. A receiving structure, constituted by profile elements 42, for flexural actuator 26 comprises a double U-shaped channel, the U's of the receiving structure being arranged in such a way that each U fits around one limb of the first U-shaped profile 38. Flexural actuator 26 is introduced between U-shaped profiles 38 of the receiving structure and also comprises there, in that region, an electrical interface 44 having connectors on each side. The counter element to the electrical interface, with connecting wiring via profile core 22, can be provided in or on profile 38. The U-shaped profiles 38, 42 of the receiving structure are preferably dimensioned such that their limbs directed toward the upper or the lower "stiff" covering skin 30 of the profile body come close to covering skin 30; this improves the transfer of shear forces between the upper and the lower covering skin 30. In addition, the arrangement is preferably selected in such a way that both one part of U-shaped profile 38 and one part of profiles 42 of the receiving structure are embedded in profile core 22, while another part extends respectively into filler material 32. It is thus possible to ensure, even when the structure is configured as a rotor blade 20 whose rotor blade flap 24 is separable from profile core 22, that the mechanical and the electrical interface are defined in such a way that even upon repeated disassembly and reassembly, absolutely no shifts of the components with respect to one another occur, and the connection can thus easily be re-established.

Figure 7:
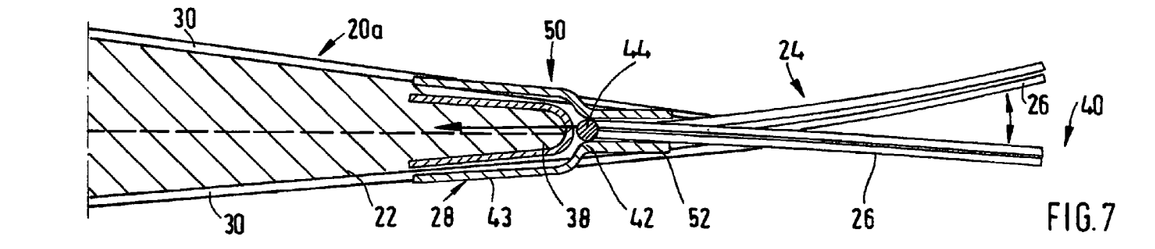
FIG. 7 shows an alternative to the electrical and mechanical interface of FIG. 6.

An alternative for mounting region 50 is shown in FIG. 7, for a case in which flexural actuator 26 constitutes rotor blade flap 24 with no surrounding first filler material 32. Flexural actuator 26 is depicted in FIG. 7 in two deflection positions. Unlike in the case of the embodiment shown in FIG. 6, profile 38 is introduced into profile core 22, or onto the trailing edge region of profile body 20a, in such a way that it is curved toward profile trailing edge 40. The receiving structure constituted by profiles 42, which likewise has substantially a U-shaped channel shape, externally surrounds the U of profile 38 with the same curvature direction. Electrical contacting means and connectors, constituting electrical interface 44, can once again be provided both on the receiving structure and on profile 38, so that when the receiving structure, constituted by profile 42, is separated from profile 38 and then reassembled again, the interface is defined. Additional positively or nonpositively engaging elements can be provided as mechanical reinforcement for the interface. Profile element 42 further contains a channel-shaped insertion opening 52, directed toward trailing edge 40 of the rotor blade profile, through which flexural actuator 26 is guided and into which it is inserted. In this case, mounting device 28 is embedded completely into profile core 22 or into the rear end of profile body 20a. Only flexural actuator 26, constituting rotor blade flap 24, projects with one end out of profile body 20a toward trailing edge 40.

Figure 8:
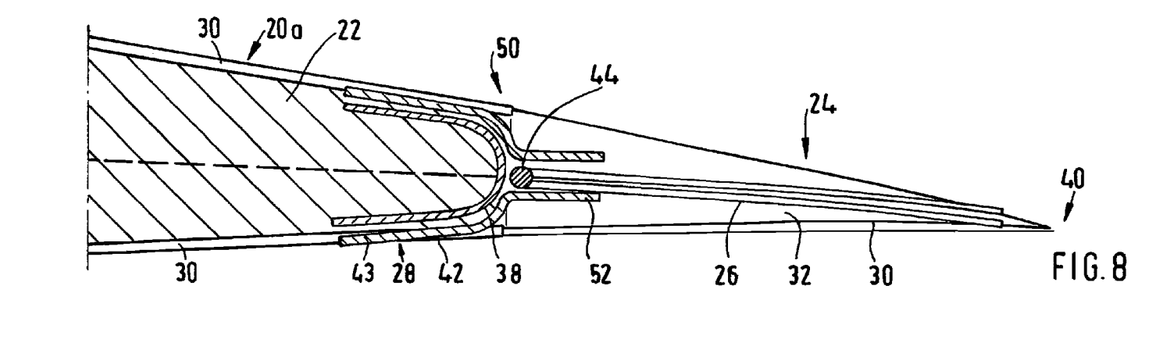
FIG. 8 shows another alternative to the electrical and mechanical interface of FIG. 6.

FIG. 8 shows the arrangement corresponding to FIG. 7 for the case in which the entire length of the portion of flexural actuator 26 projecting out of profile body 20a is embedded into an elastic first filler material 32. The outer contour of first filler material 32 forms the outer contour of rotor blade flap 24 and the outer contour of the rotor blade profile in this region. The mounting structure on the profile body, including the electrical and mechanical interface, is the same as in FIG. 7.

Figure 9:
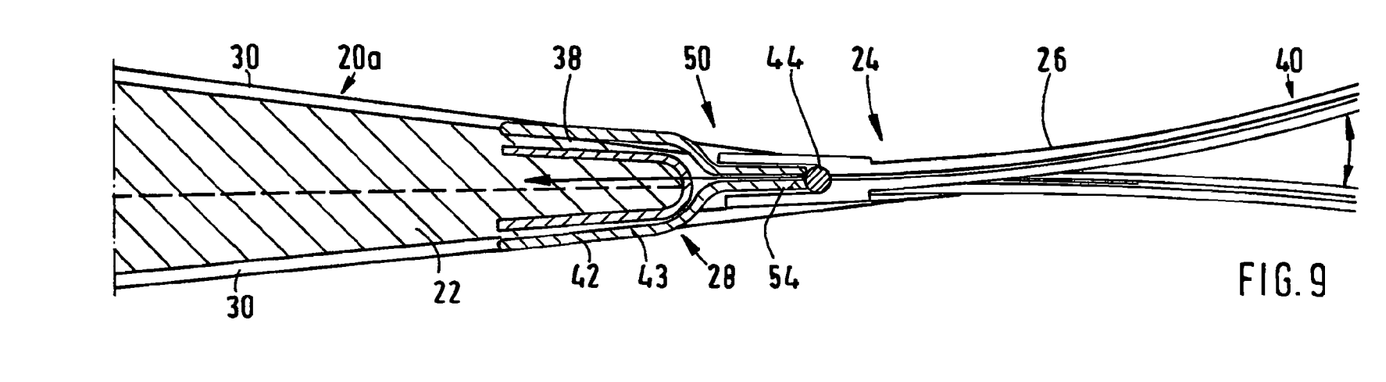
FIG. 9 shows yet another alternative to the electrical and mechanical interface of FIG. 6.
Figure 10:
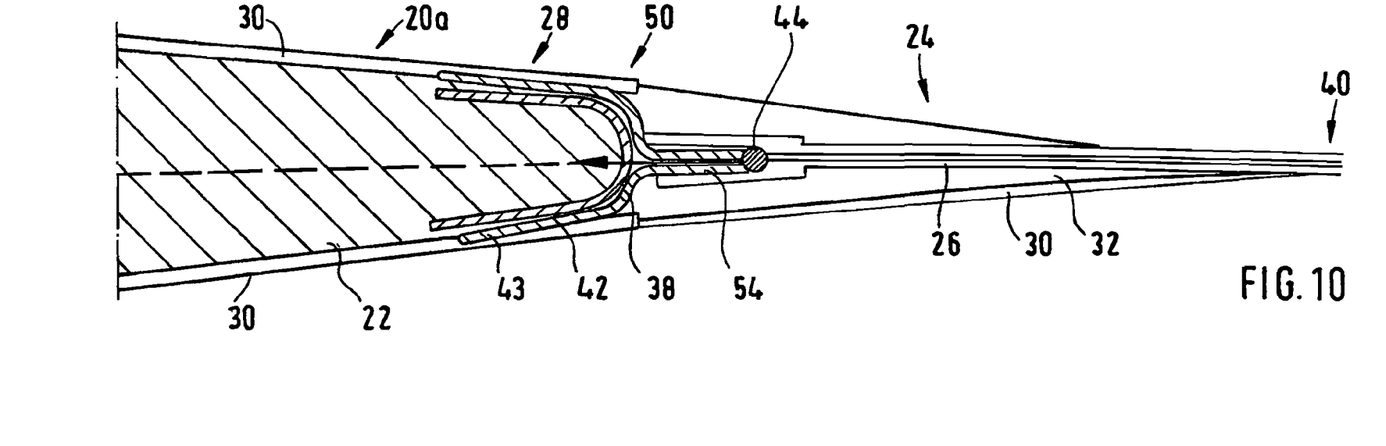
FIG. 10 shows another alternative to the electrical and mechanical interface of FIG. 6.

The mounting structures according FIGS. 9 and 10 differ from the mounting structures of FIGS. 7 and 8 in that flexural actuator 26 is not inserted into a channel-like insertion opening 52 for flexural actuator 26, but instead possesses a forked end that fits externally around a mounting projection 54. Only electrical wiring material for electrical interface 44 is guided through mounting projection 43. With the variant according to FIG. 10 as with that of FIG. 8, the flexural actuator is covered by a first filler material 32 that also extends over mounting device 50 or its mounting projection 54, and over interface 44.

Figure 11:
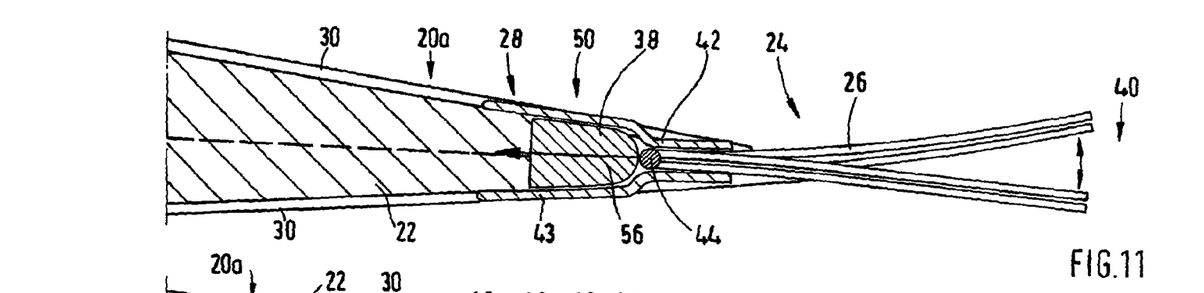
FIG. 11 shows another alternative to the electrical and mechanical interface of FIG. 6.
Figures 12, 13:
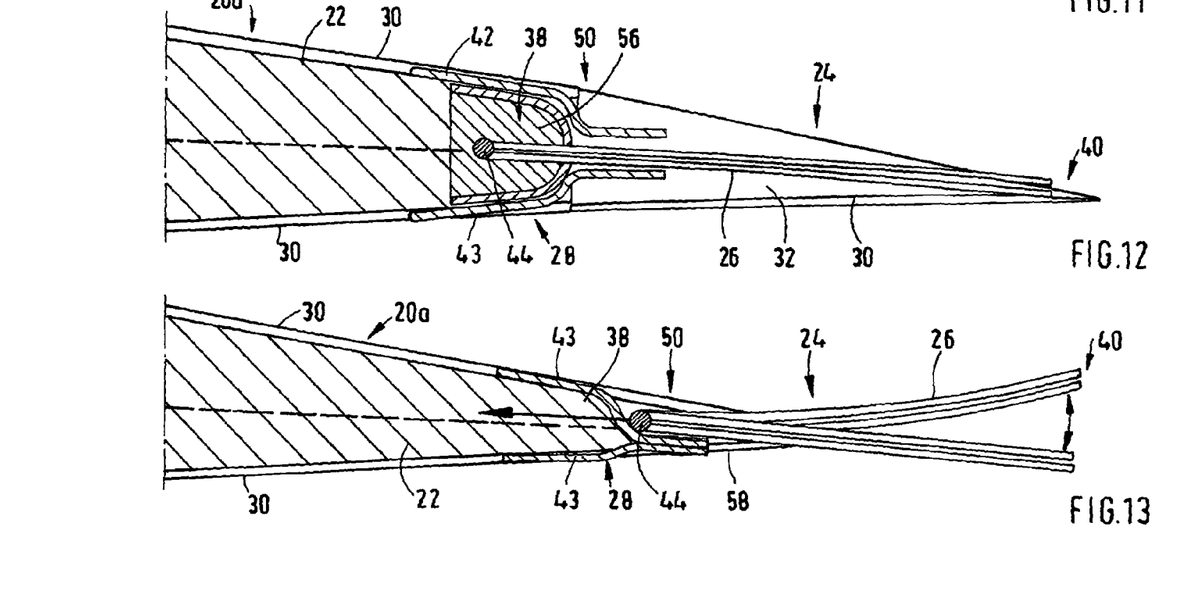
FIG. 12 shows yet another alternative to the electrical and mechanical interface of FIG. 6.
FIG. 13 shows yet another alternative to the electrical and mechanical interface of FIG. 6.

The mounting structure according to FIGS. 11 and 12 corresponds substantially to the mounting structure according to FIGS. 7 and 8. In order to increase stiffness, however, U-shaped profile 38 is filled up with a second filler material 56 that possesses greater stiffness than the material of profile core 22. In the embodiment according to FIG. 12, second filler material 56 possesses an indentation bulging in toward the trailing edge, so that a gradual transition from second filler material 56 to profile core 22, and to the upper and the lower covering skin 30, is achieved.

Flexural actuator 26 can in turn be mounted, respectively by positive and/or nonpositive engagement, on the receiving structure constituted by profiles 42.

Figures 14, 15:
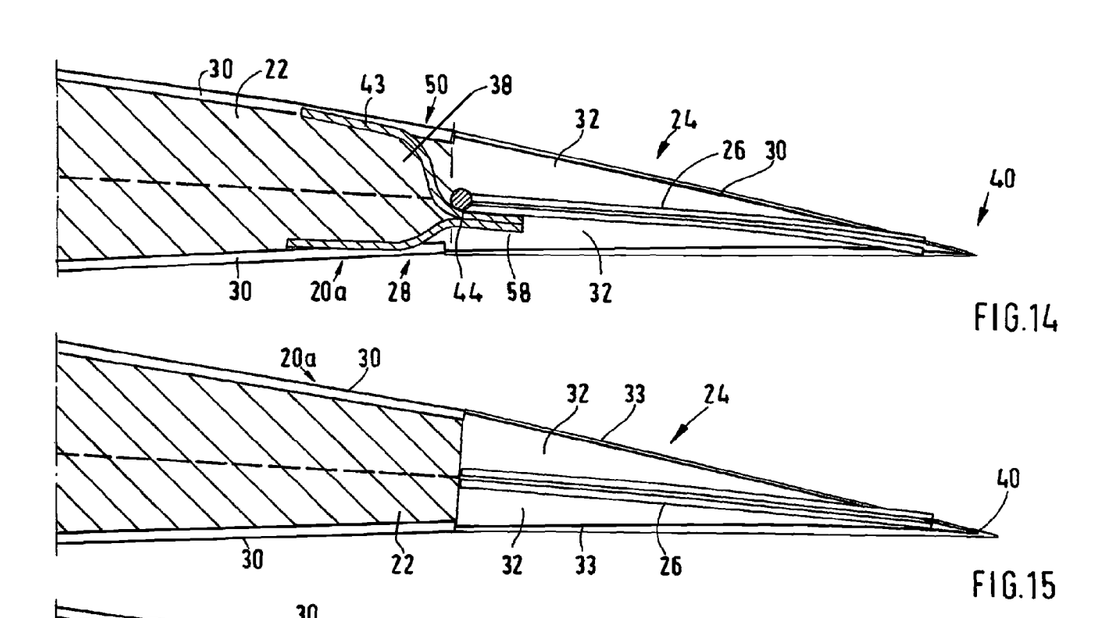
FIG. 14 shows yet another alternative to the electrical and mechanical interface of FIG. 6.
FIG. 15 is a cross-sectional view through a trailing edge region of a rotor blade according to the present invention, homogeneous filler material being used.

FIGS. 13 and 14 show further embodiments for mounting region 50. Whereas with the mounting structures according to FIGS. 6 to 10, substantially symmetrically profile elements 38, 42 were used in each case for substantially symmetrical rotor blade profiles and/or symmetrical flap profiles and flap deflections, limbs 42 of said elements extending respectively onto covering skin 30 in the region of profile core 22, with the mounting structures according to FIGS. 13 and 14 only an asymmetrical channel constituted by a profile 38 is used, which channel comprises an asymmetrically attached mounting projection 58. Flexural actuator 26 is mounted positively and/or nonpositively on one side of said projection 58. This configuration is suitable in particular for asymmetrical rotor blade profiles and/or asymmetrical flap profiles and flap deflections. This interface structure is also capable of transferring shear forces between the upper and the lower covering skin 30, and ensuring a rigid flexural interface. Flexural actuator 26 can be mounted on projection 58, for example, by adhesive bonding, riveting, soldering, bolting, or the like.

In embodiments in which flexural actuator 26 is embedded into an elastic first filler material 32 or is covered therewith, first filler material 32 can, as shown in FIG. 15, be configured as a homogeneous first filler material 32, for example as a foam or an elastomeric material or, for example, silicone. First filler material 32 fills up the region between the upper and lower sides of flexural actuator 26 and a flexurally elastic or flexible outer protective layer 33, which at this point constitutes the outer contour of the flap and of the rotor blade profile. First filler material 32 and protective layer 33 follow the reversible bending of flexural actuator 26, resulting in an arc-shaped, continuous rotor blade flap deflection.

Figure 16:
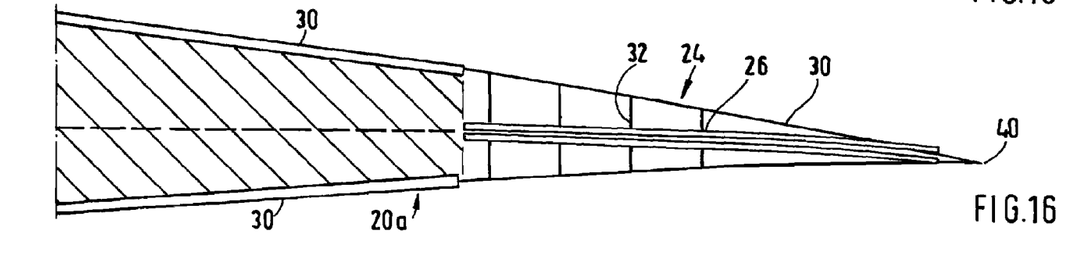
FIG. 16 is a view corresponding to FIG. 15, inhomogeneous filler material being used.

As an alternative thereto, it is also possible to use inhomogeneous material or a structure, as shown in FIG. 16, for first filler material 32. This structure is, for example, a kind of framework, e.g. made up of rib-like stiffening elements extending in the profile thickness direction, that likewise has sufficient elasticity and flexibility to follow the motion of flexural actuator 26. Both for first filler material 32 and for protective skin 33, any directional dependence of the filler or protective skin can be exploited.

In the embodiments of FIGS. 1 to 16 discussed above, the transition between rotor blade flap 24 and profile core 22 or profile body 20a and first filler material 32 has consistently been depicted as a relatively abrupt, straight-line transition. The transition can, however, of course also occur gradually.

Figure 17:
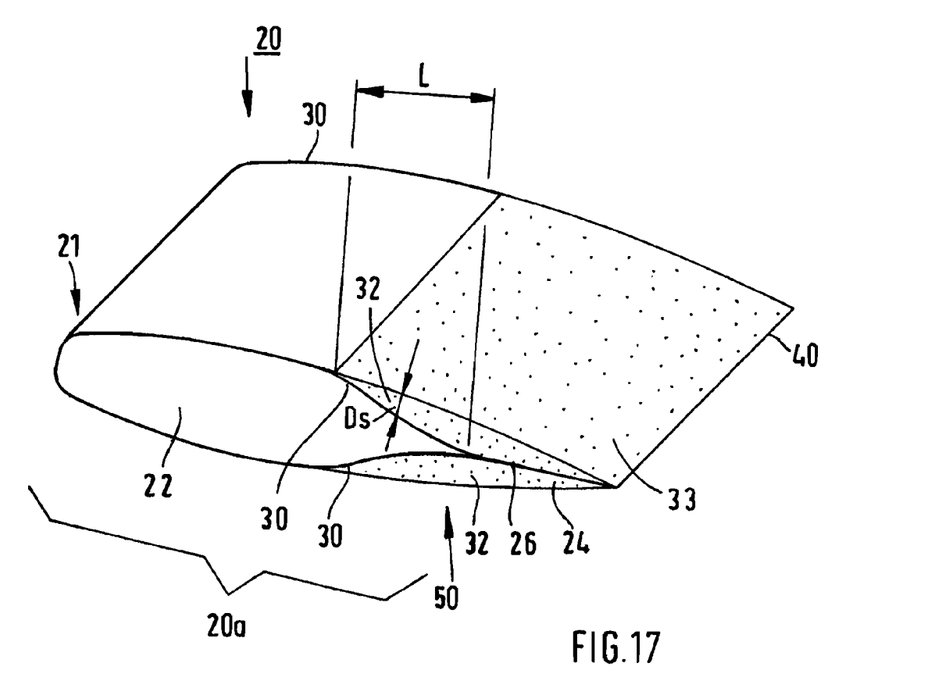
FIG. 17 shows an example of the transition between a profile body and a trailing edge region.

As shown in FIG. 17, for example, it is possible for profile body 20a having mounting region 50 to taper toward trailing edge 40. With this embodiment, first filler material 32 provided on the upper and lower side of flexural actuator 26 also extends beyond mounting region 50 and onto profile body 20a or its upper and lower covering skin 30. Transition length L (measured in the profile direction), over which first filler material 32 extends over profile body 20a, can be defined as a function of the predetermined rotor blade profile and the required profile-geometry properties of rotor blade flap 24 in the neutral state and in the deflected state. It is further evident from FIG. 17 that the local layer thickness Ds of first filler material 32, proceeding from trailing edge 40 toward mounting region 50, first increases and then decreases again in the direction toward profile tip region 21.

The invention is not limited to the exemplifying embodiments above. The rotor blade according to the present invention can instead, in the context of the scope of protection, also assume configurations other than those concretely described above. For example, it is possible for the portion of the rotor blade profile containing flexural actuator 26 and rotor blade flap 24, including that portion of profile body 20a that comprises mounting region 50, also to be configured as a separate flap module that is to be detachably mounted on the remaining portion of profile body 20a.

The invention claimed is:

1. A rotor blade comprising:
a rotor blade profile having a profile tip region, a profile trailing edge region including a trailing edge and a profile body having a profile core and a covering skin including an upper skin and a lower skin, the covering skin encasing the profile core; and
a reversibly bendable flexural actuator including a first actuator end to be fastened at an end region of the profile body, the end region pointing towards the trailing edge, and a second actuator end projecting past the profile body toward the trailing edge;
wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator,
wherein the reversibly bendable flexural actuator includes a planar shape and at least one of a plate shape and a ribbon shape,
wherein the reversibly bendable flexural actuator is disposed on at least one support layer wherein the at least one support layer is plate-shaped and reversibly bendable.

2. The rotor blade as recited in claim 1, wherein the reversibly bendable flexural actuator further includes a shape-memory alloy.

3. The rotor blade as recited in claim 1, wherein the reversibly bendable flexural actuator includes a piezoelectric element so that the reversibly bendable flexural actuator is a piezoelectric flexural actuator thereby being deformable by delivery of an electric current.

4. The rotor blade as recited in claim 1, wherein the reversibly bendable flexural actuator includes a piezoelectric flexural actuator and wherein at least one of the piezoelectric flexural actuator and the at least one support layer includes a varying thickness.

5. The rotor blade as recited in claim 1, wherein the at least one support layer includes a fiber composite.

6. The rotor blade as recited in claim 5, wherein the fiber composite includes a plastic material reinforced with a glass fiber.

7. The rotor blade as recited in claim 1, wherein the reversibly bendable flexural actuator is disposed on both sides of the at least one support layer.

8. The rotor blade as recited in claim 1, wherein the reversibly bendable flexural actuator is disposed on one side of the at least one support layer.

9. The rotor blade as recited in claim 1, wherein the at least one support layer includes a return device.

10. A rotor blade comprising:
a rotor blade profile having a profile tip region, a profile trailing edge region including a trailing edge and a profile body having a profile core and a covering skin including an upper skin and a lower skin, the covering skin encasing the profile core; and
a reversibly bendable flexural actuator including a first actuator end to be fastened at an end region of the profile body, the end region pointing towards the trailing edge, and a second actuator end projecting past the profile body toward the trailing edge;
wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator,
wherein the reversibly bendable flexural actuator includes a planar shape and at least one of a plate shape and a ribbon shape, and
wherein the movable rotor blade flap is covered with a first filler material being flexible and flexurally elastic and the first filler material forming an outer profile of the movable rotor blade flap.

11. The rotor blade as recited in claim 10, wherein the first filler material further extends along the profile body.

12. The rotor blade as recited in claim 10, wherein the first filler material is a homogenous material.

13. The rotor blade as recited in claim 12, wherein the first filler material includes at least one of a silicone material and a foam material.

14. The rotor blade as recited in claim 10, wherein the first filler material is an inhomogeneous material.

15. The rotor blade as recited in claim 14, wherein the inhomogeneous material includes at least one of a rib-like, a framework-like and a skeleton-like, filler material.

16. The rotor blade as recited in claim 10, wherein the first filler material includes a protective skin, the protective skin being flexible and flexurally elastic and including an outer contour of the rotor blade profile in at least a rotor blade flap region.

17. The rotor blade as recited in claim 16, wherein first filler material is integrated with the protective skin.

18. The rotor blade as recited in claim 16, wherein the protective skin includes a protective layer applied on the first filler material.

19. A rotor blade comprising:
a rotor blade profile having a profile tip region, a profile trailing edge region including a trailing edge and a profile body having a profile core and a covering skin including an upper skin and a lower skin, the covering skin encasing the profile core; and
a reversibly bendable flexural actuator including a first actuator end to be fastened at an end region of the profile body, the end region pointing towards the trailing edge, and a second actuator end projecting past the profile body toward the trailing edge;

wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator, wherein the reversibly bendable flexural actuator includes a planar shape and at least one of a plate shape and a ribbon shape, and wherein the upper skin and the lower skin extend to the first actuator end and are configured so as to retain the reversibly bendable flexural actuator and wherein the second actuator end freely projects between the upper skin and the lower skin.

20. A rotor blade comprising:

a rotor blade profile having a profile tip region, a profile trailing edge region including a trailing edge and a profile body having a profile core and a covering skin including an upper skin and a lower skin, the covering skin encasing the profile core; and a reversibly bendable flexural actuator including a first actuator end to be fastened at an end region of the profile body, the end region pointing towards the trailing edge, and a second actuator end projecting past the profile body toward the trailing edge;

wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator, wherein the reversibly bendable flexural actuator includes a planar shape and at least one of a plate shape and a ribbon shape, and wherein the covering skin extends to the reversibly bendable flexural actuator and wherein the covering skin in a region that extends to the reversibly bendable flexural actuator has a reduced thickness compared to the covering skin in a region that does not extend to the reversibly bendable flexural actuator.

21. A rotor blade comprising:

a rotor blade profile having a profile tip region, a profile trailing edge region including a trailing edge and a profile body having a profile core and a covering skin including an upper skin and a lower skin, the covering skin encasing the profile core; and a reversibly bendable flexural actuator including a first actuator end to be fastened at an end region of the profile body, the end region pointing towards the trailing edge, and a second actuator end projecting past the profile body toward the trailing edge;

wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator, wherein the reversibly bendable flexural actuator includes a planar shape and at least one of a plate shape and a ribbon shape, and wherein the covering skin extends to the reversibly bendable flexural actuator and includes a local discontinuity in reversibly bendable flexural strength wherein the local discontinuity includes a virtual rotor blade flap articulation configured to allow the profile trailing edge region to be deformable so as to include the arc-shaped movable rotor blade flap deflection.

22. A rotor blade comprising:

a rotor blade profile having a profile tip region, a profile trailing edge region including a trailing edge and a profile body having a profile core and a covering skin including an upper skin and a lower skin, the covering skin encasing the profile core; and a reversibly bendable flexural actuator including a first actuator end to be fastened at an end region of the profile body, the end region pointing towards the trailing edge, and a second actuator end projecting past the profile body toward the trailing edge;

wherein the projecting second actuator end forms part of the profile trailing edge region and forms a movable rotor blade flap, the movable rotor blade flap being deformable into an arc-shaped rotor blade flap deflection upon bending of the reversibly bendable flexural actuator, wherein the reversibly bendable flexural actuator includes a planar shape and at least one of a plate shape and a ribbon shape; and a mounting device disposed in the end region of the profile body for mounting the reversibly bendable flexural actuator and wherein at least one of the reversibly bendable flexural actuator and the profile trailing edge region is configured to detachably mount on the mounting device.

23. The rotor blade as recited in claim 22, wherein the mounting device includes a terminating profile structure connectable to the profile trailing edge region of the profile body, wherein the terminating profile structure includes at least one of an insertion opening configured to allow an insertion of the first actuator end and a mounting projection configured to allow a mounting of the first actuator end.

24. The rotor blade as recited in claim 23, wherein the first actuator end includes a connector region slidable onto the mounting projection.

25. The rotor blade as recited in claim 23, wherein the first actuator end includes a ribbon shape and is configured to be disposed planar and securable to the mounting projection.

26. The rotor blade as recited in claim 23, wherein the terminating profile structure includes a first U-shaped profile having an open side facing the profile tip region and including a limb connectable directly or indirectly to the upper and lower covering skin.

27. The rotor blade as recited in claim 26, wherein the first U-shaped profile includes a profile region disposed on a side facing the trailing edge, wherein the profile region includes the mounting projection.

28. The rotor blade as recited in claim 26, wherein the first U-shaped profile includes at least one profile element configured to mount on the U-shaped profile, the at least one profile element configured to fit around the U-shaped profile and including a first profile region directly or indirectly connectable to at least one of the upper skin and the lower skin and including a second profile region facing the trailing edge, wherein the second profile region includes the mounting projection.

29. The rotor blade as recited in claim 26, wherein the first U-shaped profile includes a loop-shaped profile region, the loop-shaped profile region extending toward the profile tip region and toward the profile core and wherein the loop-shaped profile region includes an indentation open toward the trailing edge, the indentation including the insertion opening and wherein the loop-shaped profile region is enclosable from a side of the profile core and wherein the loop-shaped profile includes a second substantially U-shaped profile including an open side facing the trailing edge.

30. The rotor blade as recited in claim 26, wherein the first U-shaped profile is partially fillable with a second filler material including a stiffness greater than a stiffness of a material of the profile core.

31. The rotor blade as recited in claim 22, wherein the mounting device includes at least one of an electric interface and an electrical connector configured to at least one of supply energy to and control the flexural actuator.

* * * * *